United States Patent [19]
Fukazawa et al.

[11] 4,173,073
[45] Nov. 6, 1979

[54] TRACK DISPLACEMENT DETECTING AND MEASURING SYSTEM

[75] Inventors: Yoshiro Fukazawa; Takahiko Mochinaga, both of Tokyo; Morimasa Shirozume, Chigasaki; Satoru Kishimoto, Higashikurume; Makoto Ito, Hadano; Fukuo Iwaya, Tokyo, all of Japan

[73] Assignees: Hitachi, Ltd.; Japanese National Railways; Hitachi Electronics Engineering Co., Ltd., all of Japan

[21] Appl. No.: 852,974

[22] Filed: Nov. 18, 1977

[30] Foreign Application Priority Data

May 25, 1977 [JP] Japan .................................. 52-59780
May 25, 1977 [JP] Japan .................................. 52-59781
May 25, 1977 [JP] Japan .................................. 52-59782

[51] Int. Cl.² .................... E01B 27/17; E01B 33/00; E01B 35/02; E61K 9/08
[52] U.S. Cl. ........................................ 33/1 Q; 33/144; 33/338; 73/146; 104/7 B
[58] Field of Search ................ 33/287, 1 Q, 144, 338; 104/7 R, 7 B, 8; 73/146

[56] References Cited
U.S. PATENT DOCUMENTS

| | | | |
|---|---|---|---|
| 3,068,706 | 12/1962 | Lankow | 33/323 |
| 3,517,307 | 6/1970 | Wallen et al. | 33/144 |
| 3,924,461 | 12/1975 | Stover | 33/144 |
| 4,005,601 | 2/1977 | Botello | 33/144 |

*Primary Examiner*—Steven L. Stephan
*Attorney, Agent, or Firm*—Craig and Antonelli

[57] ABSTRACT

A track displacement detecting and measuring system in which track displacement data are obtained as usual for a unit chord length of the track according to the conventional three-point measuring method by sensors mounted on three predetermined parts of a track inspection car, and such measured data are processed by an arithmetic or processing device of relatively simple structure to detect the amount of track displacement occurring over a track distance which is two or four times the unit chord length. In the system, an improved gyro device free from the adverse effect of rolling of the car is employed so as to permit precise detection of vertical track displacement irrespective of the track distance. The system includes reflecting members of stainless steel disposed at a predetermined angle with respect to the track, a laser pulse projector, a reflected pulse receiver and a signal processing circuit so that errors of distance marks used for the recording of measured data can be corrected stably and with high precision.

5 Claims, 25 Drawing Figures

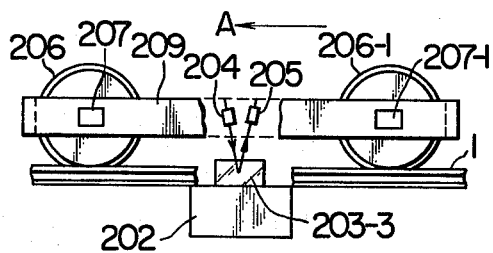
FIG. 16a
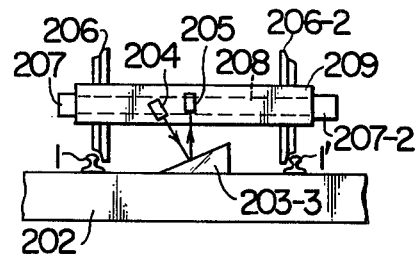
FIG. 16b
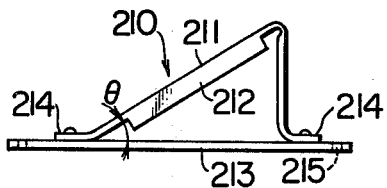
FIG. 17a
FIG. 18
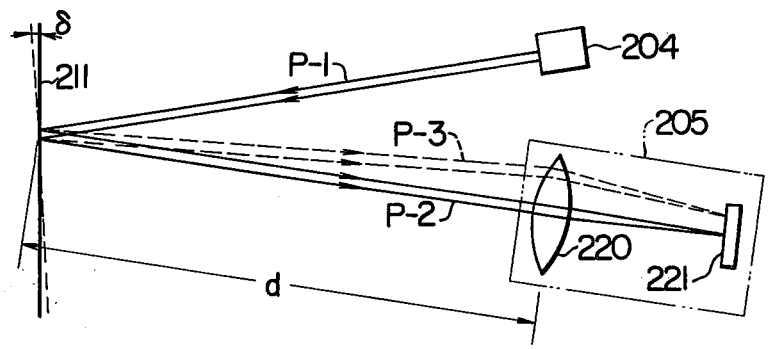
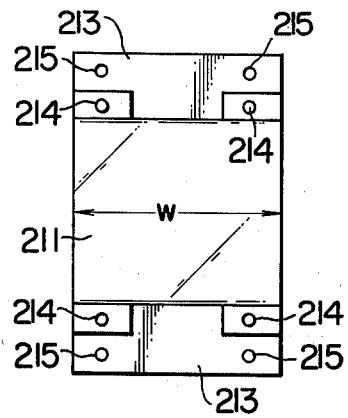
FIG. 17b
FIG. 19
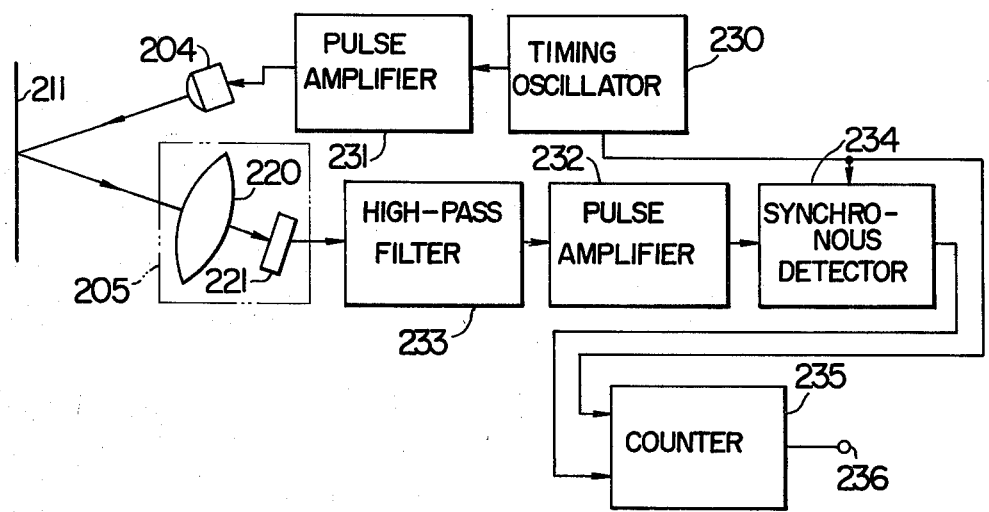

TRACK DISPLACEMENT DETECTING AND MEASURING SYSTEM

LIST OF PRIOR ART REFERENCES (37 DFR 1.56 (a))

The following references are cited to show the state of the art:
1. NTI Measuring System of New Track Inspection Car (Type 4001) for the New Tokaido Line
2. Measuring Equipments of No. 2 Track Inspection Car for New Tokaido Line
3. Data Processing of Track Inspection Car for New Tokaido Line
4. Maya 34 Type High Speed Track Inspection Car and Measuring System
5. Long-Wavelength Vertical Track Displacement Measuring System, 20-Meter Chord Track Displacement Computing Device and Records of Measurement

BACKGROUND OF THE INVENTION

This invention relates to a track displacement detecting and measuring system.

In the New Tokaido Line of Japanese National Railways, track displacement has been measured by a track inspection car as disclosed in the References Nos. 1, 2, 3, 4 and 5. In the prior art track displacement detecting and measuring system of the type used in such a track inspection car, track displacement has been measured in a manner as described below. In this specification, the term "track displacement" is limitatively used to designate horizontal track displacement and vertical track displacement. The horizontal track displacement refers to horizontal deviation of the rails from a predetermined preset position in the direction perpendicular to the rail direction on the plane of the track, and the vertical track displacement refers to upward or downward deviation of the rails from a preset position in a vertical plane (referred to hereinafter as a longitudinal plane) along the extending direction of the track.

In the prior art track displacement detecting and measuring system, a sensor is mounted on each of a front truck, a middle truck and a rear truck of the track inspection car to measure deviation of the rails from a preset position in the transverse or vertical direction. The distance between the sensors mounted on the front and rear trucks of the track inspection car is set at a basic length for track displacement measurement (which length corresponds to a chord when a portion of the track is regarded as an arc), and the so-called three-point measuring method is resorted to for detecting track displacement on the basis of data obtained from the three sensors. This basic length is generally selected to be 10 meters in the case of the track inspection car above described. Thus, track displacement ranging over a track distance beyond this basic length cannot be correctly measured since the basic length is limited to 10 meters.

In a high-speed railway such as the New Tokaido Line of Japanese National Railways in which a train of passenger cars are designed to run at a maximum speed exceeding 200 kilometers per hour, the importance of proper track maintenance is greater than other railways of lower speeds in order to ensure the safety of train operation and to provide a comfortable sense of ride for the passengers. For example, according to the results of researches on the relation between track displacement and joggling of passenger cars, it has been found that horizontal track displacement and vertical track displacement ranging over a track distance of from more than about 10 meters to several tens of meters provide the greatest factor which causes joggling of passenger cars resulting in an uncomfortable sense of ride for the passengers. With such track displacement ranging over a long distance of the track (called long-wavelength track displacement by the parties concerned), not only the errors of measurement tend to increase inevitably, but also the desired measurement is rendered almost impossible when the so-called three-point measuring method based on the conventional basic length is resorted to.

For purposes of better track maintenance to ensure the safety of train operation, to provide the comfortable sense of ride for passengers and to permit running of the train at high speeds, a track displacement detecting and measuring system capable of precisely and conveniently measuring the long-wavelength track displacement has been strongly demanded.

In a system of this kind, a gyro device is generally used for the detection of vertical track displacement. The prior art system using a simple vertical gyro having two free axes has been able to measure the long-wavelength vertical track displacement only with difficulty due to the fact that such a gyro operates instably against rolling or joggling of the track inspection car to the left and right and is thus unable to ensure measurement with high precision.

According to the present invention which will be described in detail later, data obtained from sensors adapted for three-point measurement are ingeniously computed and processed while employing a basic length (a unit chord length) equivalent to that employed heretofore in the track inspection car, so that the result of the measurement (the detected amount of track displacement) is substantially the same as that obtained by a track displacement car having, as it were, a basic length which is two or four times the conventionally employed basic length. Further, according to the present invention, an improved gyro device capable of detecting vertical track displacement relative to the ground line is used so that long-wavelength vertical track displacement can be theoretically measured irrespective of the length of the track having such track displacement.

The measured data of track displacement must be recorded in exact coincidence with the measured points or positions. In a prior art manner of recording, the measured data is recorded, together with distance pulses occurring at intervals of a predetermined distance, on a recording sheet continuously fed at a rate proportional to the traveling speed of the track inspection car. However, the distance pulses are not always generated at a rate proportional to the traveling distance of the track inspection car, and the error due to lack of correspondence tends to accumulate to provide a large error which is no longer negligible in the measurement which is continued over a long distance. The prior art manner of recording has thus had a serious defect that the data obtained by the measurement is no longer relevant in an extreme case. In an effort to obviate such a defect, an optical position detecting device including reflecting members disposed along the track at intervals of a predetermined distance of, for example, 1 kilometer has been proposed. In the proposed device, an optical detecting means responds to the light reflected from the reflecting members to produce a detected position signal which is used for the correction of the error occurring in each of the sections of predetermined distance thereby avoiding accumulation of the error. However, this optical detecting means has had a low detection sensitivity and thus has not been fit for practical use.

The track displacement detecting and measuring system according to the present invention includes an improved optical position detecting device so that the physical position of the track inspection car can be detected with high precision thereby permitting highly precise measurement of track displacement.

SUMMARY OF THE INVENTION

With a view to obviate the prior art defects pointed out above, it is a primary object of the present invention to provide a novel and improved track displacement detecting and measuring system which is capable of precise measurement of track displacement ranging over a long track distance which is two or four times as long as the basic length or what is called herein the unit chord length.

Another object of the present invention is to provide an economical track displacement detecting and measuring system of small size and light weight in which the data of track displacement obtained for the basic length or unit chord length in a manner similar to that of measurement by the prior art system of this kind are processed by a simple digital arithmetic circuit consisting essentially of shift registers and adders so as to permit highly precise measurement of long-wavelength track displacement.

Still another object of the present invention is to provide an improved gyro device including a pair of gyro units and a servo mechanism therefor so as to permit the highly precise measurement of long-wavelength track displacement.

A further object of the present invention is to provide an improved car position detecting device of optical type preferably incorporated in the track displacement detecting and measuring system described in the primary object.

The above and other objects, features and advantages of the present invention will be more clear from the following description with reference to the accompanying drawings.

BRIEF DESCRIPTION OF THE DRAWINGS

FIGS. 6a and 6b illustrate the principle of the known manner of track displacement measurement for a multiple chord length utilized in the present invention, in which FIG. 6a is a schematic plan view showing an "upwardly convex" irregularity of the track, and FIG. 6b is a schematic plan view showing a variation of the track curvature from an "upwardly convex" irregularity to a "downwardly convex" irregularity.

FIGS. 16a and 16b are a schematic side elevational view and a schematic front elevational view respectively of a truck to illustrate the mounting position of a light projector and a light receiver, when viewed in a direction orthogonal to the direction of the track and in a direction parallel to the direction of the track respectively.

FIGS. 17a and 17b are a schematic side elevational view and a schematic plan view respectively of a reflecting member preferably employed in an optical position detecting device in the system according to the present invention.

FIG. 18 is a diagrammatic view to illustrate how the optical path deviates from the normal path due to a mounting error of the reflecting member shown in FIGS. 17a and 17b.

FIG. 19 is a block diagram of a circuit preferably employed in the optical position detecting device in the system according to the present invention.

DESCRIPTION OF THE PREFERRED EMBODIMENTS

For a better understanding of the present invention, the principle of measurement of track displacement by a track inspection car and a prior art manner of displacement will be described briefly before describing the present invention in detail.

Figure 1:
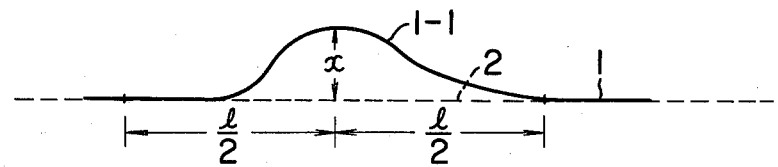
FIG. 1 is a diagrammatic plan view of a portion of the track to illustrate track displacement occurring in such a portion.

FIG. 1 is a schematic plan view showing in an exaggarated fashion the amount of horizontal track displacement (referred to hereinafter merely as horizontal track displacement) in a straight portion of a rail. Referring to FIG. 1, the reference numeral 1 designates one of the left-hand and right-hand rails of the track including a horizontally displaced portion 1-1, and 2 designates the chord connecting between the ends of the associated rail portion. In FIG. 1, the length of the chord 2 is l which is a basic length, and the distance x between the center of the chord 2 and the horizontally displaced portion 1-1 is defined as the horizontal track displacement.

Figure 2A:
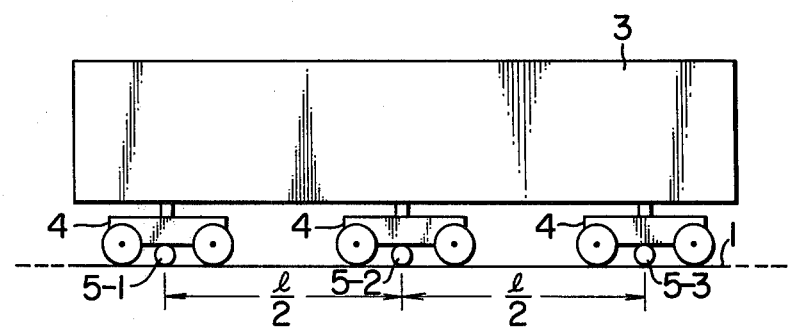
FIGS. 2a and 2b are a schematic side elevational view and a schematic perspective view respectively of a track inspection car to show the position of measuring wheels and the relation between one of the measuring wheels and associated parts.
Figure 2B:
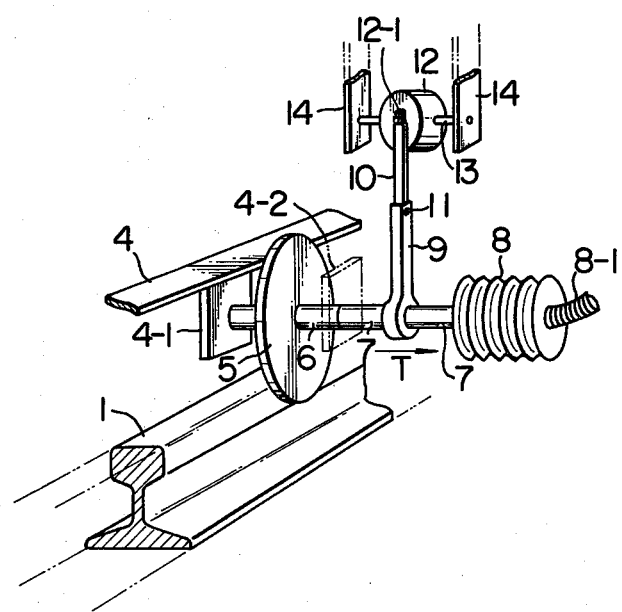

FIGS. 2a and 2b show a mechanism used for the measurement of the horizontal track displacement x defined above. Referring to FIG. 2a, a track inspection car body 3 is carried by three trucks 4 having a front measuring wheel 5-1, a middle measuring wheel 5-2 and a rear measuring wheel 5-3 respectively. These three measuring wheels 5-1, 5-2 and 5-3 are spaced apart from each other by a distance l/2, and the length of the line connecting between the front measuring wheel 5-1 and the rear measuring wheel 5-3 corresponds to the chord length l. Referring to FIG. 2b, the shaft 6 of each measuring wheel 5 is journaled at both ends in a pair of bearings 4-1 and 4-2 fixed to the associated truck 4 so that the measuring wheel 5 can rotate freely. A connecting rod 7 engages the inner end of the shaft 6 to transmit axial deviation of the shaft 6 to a mechano-electrical angle transducer 12 described later. This connecting rod 7 is held against rotation by means (not shown) provided in the bearings 4-2 but can freely move in its axial direction. Compressed air is supplied into a bellows type air spring 8 from an air inlet 8-1 so that the connecting rod 7 is normally urged by the air spring 8 to press the rail-engaging portion of the measuring wheel 5 against the side face of the head portion of the rail 1. An arm 9 is fixedly mounted at its lower end on the connecting rod 7 and is connected at its upper end to the lower end of another arm 10. The joint 11 between these arms 9 and 10 includes a single ball.

The upper end of the arm 10 is secured to the central shaft 12-1 of a mechano-electrical angle transducer 12 (referred to hereinafter merely as an angle transducer). This transducer is of the type commonly sold in the market and its practical structure comprises a rotor having a primary winding and a stator having a secondary winding. Its operation is such that, in response to the application of an AC voltage of predetermined amplitude to the primary winding, an AC voltage (current) of amplitude proportional to the relative angular deviation of the rotor and stator due to the rotation of the rotor appears at the output of the transducer. The angle transducer 12 is supported by a pair of supporting shafts 13 which are journaled in respective bearings 14 fixed to the car body 3.

Whe now horizontal track displacement is present on one of the rails 1 on which the track inspection car runs, the measuring wheels 5 are displaced relative to the car body 3 in a direction orthogonal to the direction of the track due to the horizontal track deviation. This deviation causes corresponding deviation of the connecting rod 7 in a direction shown by the arrow T in FIG. 2b, and the deviation of the connecting rod 7 is transmitted through the arms 9 and 10 to cause corresponding angular deviation of the shaft 12-1 of the angle transducer 12. Thus, an electrical output corresponding to this angular deviation appears from the angle transducer 12. The uniball joint 11 and the shafts 13 supporting the angle transducer 12 act to absorb the vertical and longitudinal deviation of the car body 3 and trucks 4 to prevent the angular deviation of the shaft 12-1 of the angle transducer 12 from being affected by such vertical and longitudinal deviation.

The measuring wheels 5-1, 5-2 and 5-3 shown in FIG. 2a are arranged in the manner above described. The three angle transducers are so regulated that their electrical outputs are null when the rail 1 is straight and the left-hand and right-hand rails 1 are accurately spaced apart from each other by the standard distance. When now horizontal track displacement is present on the rail 1 shown in FIG. 2a, the measuring wheels 5-1, 5-2 and 5-3 detect deviations $x_1$, $x_2$ and $x_3$ respectively which are orthogonal to the direction of the rail 1. On the basis of these three displacements $x_1$, $x_2$ and $x_3$, the horizontal track displacement x is generally computed as follows:

$$x = x_2 - \frac{x_1 + x_3}{2} \quad (1)$$

The deviations $x_1$, $x_2$ and $x_3$ have either a positive sign or a negative sign. Thus, the horizontal track deviation x has a negative sign and a positive sign when, for example, the displacement of the measuring wheel 4 inward toward and outward away from the rail 1 is determined to be negative and positive respectively.

Consider then vertical track displacement. This vertical track displacement can be detected in a manner entirely similar to that described with reference to the horizontal track displacement. Thus, the horizontal track displacement existing in the horizontal plane including the track may be replaced by the vertical track displacement existing in the vertical plane including the track when FIG. 1 is regarded to be a vertical sectional view.

Figure 3:
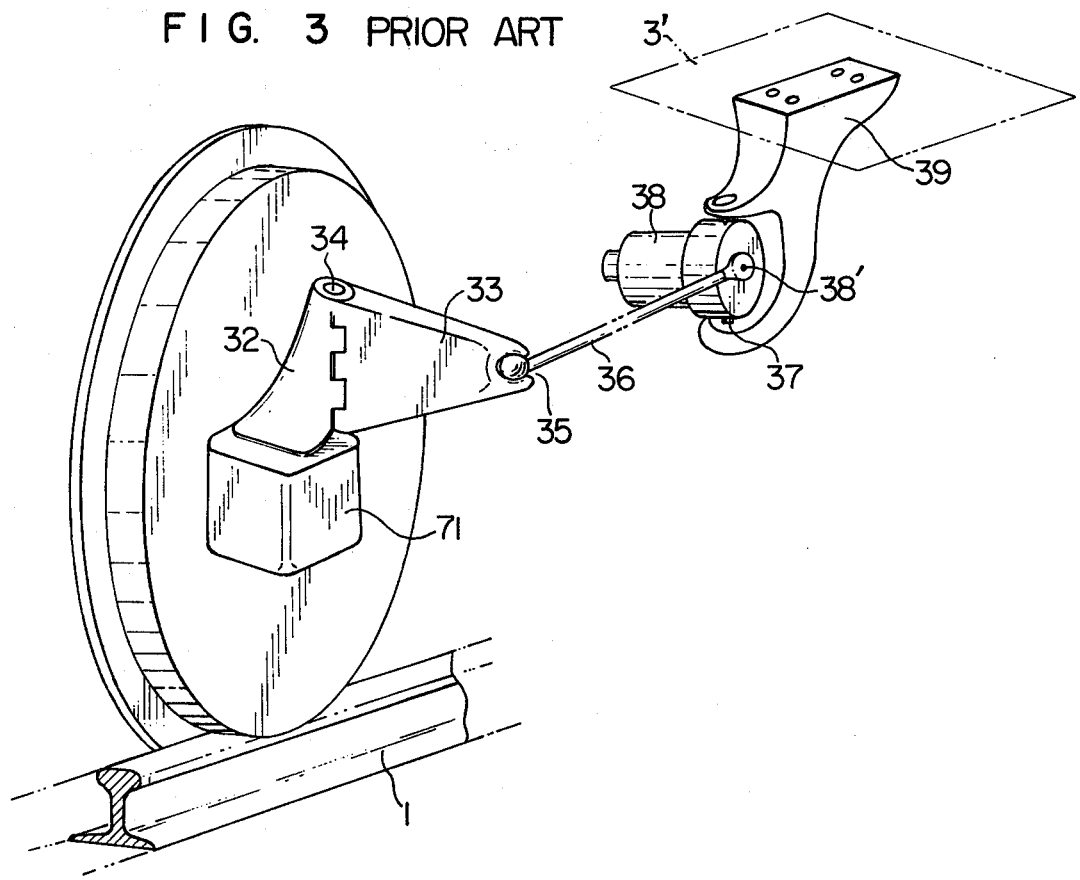
FIG. 3 is a schematic perspective view of a mechanism used heretofore for the measurement of the amount of vertical track displacement.

For the purpose of measurement of vertical track displacement, a mechanism as shown in FIG. 3 is used in lieu of the mechanism including the measuring wheels shown in FIGS. 2a and 2b. Referring to FIG. 3, a fitting 32 fixed to a journal box 71 is connected to one end of an arm 33 by a hinge joint 34, and the other end of the arm 33 is connected to one end of a connecting rod 36 by a uniball joint 35. The other end of the connecting rod 36 is connected to the shaft 38' of an angle transducer 38. A fitting 39 is fixed to the floor 3' of the track inspection car body 3 to support the angle transducer 38 through a hinge connection 37. Thus, the vertical deviation only of the journal box 71 is transmitted to cause corresponding angular deviation of the shaft 38' of the angle transducer 38. This angular deviation represents the deviation of the journal box 71 relative to the floor 3' of the car body 3 since the fitting 39 supporting the angle transducer 38 is fixed to the floor 3'. The hinge connection 37 between the fitting 39 and the angle transducer 38 provides freedom of lateral movement of the journal box 71 relative to the car body 3 thereby ensuring smooth operation of the vertical track deviation measuring mechanism.

Three measuring mechanisms each as shown in FIG. 3 are disposed at the front, middle and rear parts respectively of the track inspection car, and data obtained from these three measuring mechanisms provides the amount of vertical track displacement in a manner entirely similar to that described above. Therefore, any detailed description will not be especially given herein as to the measurement of this vertical track displacement.

Besides the methods of measurement of horizontal track deviation using the measuring wheels 5 mechanically engaging the rail 1, an optical method of measuring such deviation has recently been developed. This optical method is essentially entirely the same as the mechanical method in that the chord length l is also used for the measurement of the horizontal track displacement.

The above description has specifically referred to the case in which the length of the displaced track portion 1-1 of the rail 1 is shorter than the chord length l as shown in FIG. 1. The value of this chord length l is limited by the length of the track inspection car, that is, it is limited to a maximum of about 10 meters. However, as pointed out above, an actual displaced track portion exceeds sometimes this chord length l resulting in a large measurement error or in impossibility of track displacement measurement.

Figure 4:
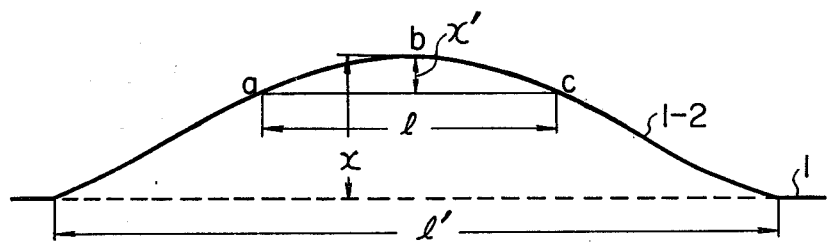
FIG. 4 is a diagrammatic plan view of a portion of the track to illustrate the principle of measurement of long-waveform track displacement.
Figure 5:
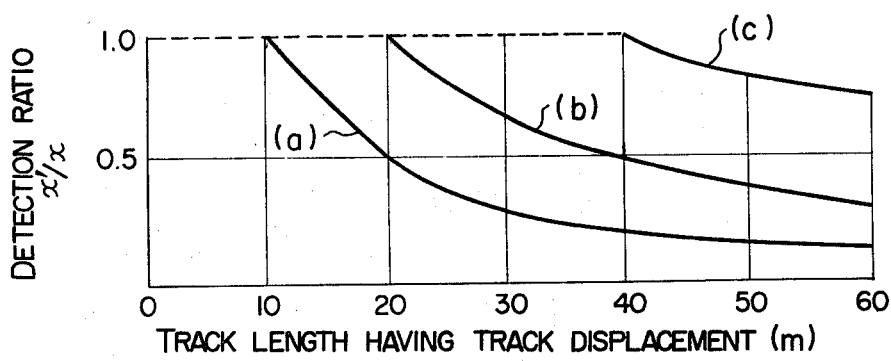
FIG. 5 is a graph showing the relation between the track length having track displacement and the rate of detection of the track displacement.

Such a situation will be described with reference to FIGS. 4 and 5. Referring to FIG. 4, a displaced track portion 1-2 has a length larger than the chord length l, and it is apparent, in such a case, that the measured track displacement x' is considerably smaller than the true track displacement x. Such a consequence occurs in both the measurement of horizontal track displacement and the measurement of vertical track displacement. The ratio x'/x between the measured value x' of track displacement larger than the chord length l and the true value x of track displacement is called herein a displacement detection ratio. This displacement detection ratio x'/x is dependent upon the shape of the curve of the track including the track displacement and varies depending on individual curves. FIG. 5 shows the results of computation of the displacement detection ratio x'/x when the curve is assumed to be sinusoidal, for example. Referring to FIG. 5, the curve (a) represents the displacement detection ratio for a chord length of 10 meters. It will be seen from the curve (a) that the detection ratio is unity, that is, the measured value x' is equal to the true value x within the range in which the length of the displaced track portion is smaller than 10 meters, but with the increase in the length of the displaced track portion beyond 10 meters, the displacement detection ratio x'/x decreases gradually until finally the measurement becomes virtually impossible. The curve (b) represents the displacement detection ratio x'/x for a chord length of 20 meters. It will be seen from the curve (b) that a displaced track portion longer than the case of the 10-meter chord length can be detected. The curve (c) represents the displacement detection ratio x'/x for a chord length of 40 meters, and it will be seen that a further longer displaced track portion can be detected.

With the recent tendency toward a higher and higher speed of trains, precise track maintenance is increasingly required as described hereinbefore. Especially, in the New Tokaido Line, it is required to detect even a displaced track portion which extends over a distance of several tens of meters.

An embodiment of the track displacement detecting and measuring system according to the present invention will now be described in detail with reference to FIGS. 6a to FIG. 19.

At first, the principle of computing track displacement for a multiple cord length (which is a multiple of the unit chord length l of 10 meters and is an even number) using the data of track displacement for the known chord length l of 10 meters reported in the Reference No. 5.

Figure 6A:
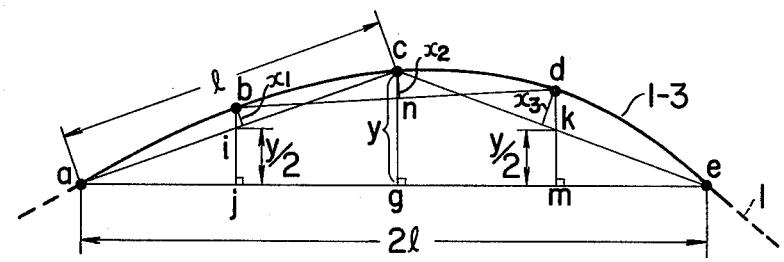
Figure 6B:
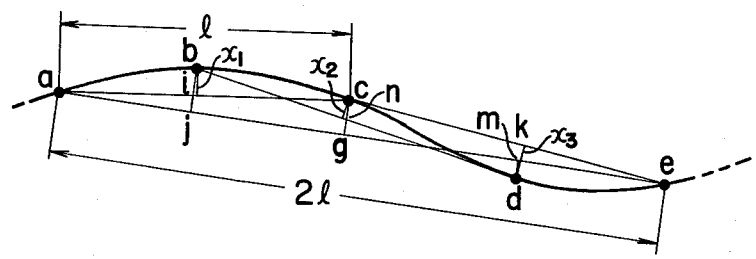

Referring to FIGS. 6a and 6b, a displaced track portion 1-3 is in the form of an upwardly convex curve. A plurality of measuring points a, b, c, d and e are taken at predetermined intervals on the displaced track portion 1-3, so that all the chords ac, bd and ce have the same length l. The principle of measurement of track displacement for the unit chord length l is applied to measure the values of $x_1$, $x_2$ and $x_3$ for the individual chords ac, bd and ce respectively. It is assumed in this case that the displaced track portion 1-3 has a small curvature. When so assumed, the length of the chord ae is approximately equal to 2 l. Thus, when the length y of the segment $\overline{cg}$ connecting between the point c and the foot g of the perpendicular extending from the point c to the chord ae is computed, the value of y gives the track displacement for the multiple chord length 2 l relative to the original chord length l. In order to seek the value of y, a perpendicular is drawn from the point b to extend toward the chord ae thereby obtaining points i and j of intersection with the chords ac and ae respectively. Similarly, a perpendicular is drawn from the point d to extend toward the chord ae thereby obtaining points k and m of intersection with the chords ce and ae respectively. The perpendicular extending from the point c toward the chord ae intersects the chord bd at a point n.

When it assumed again that the displaced track portion 1-3 has a small curvature, the following relations hold:

$$bi \approx x_1, \quad cn \approx x_2, \quad dk \approx x_3 \tag{2}$$

Noting that the points j and m lie approximately in the middle of the segments $\overline{ag}$ and $\overline{ge}$ respectively, the following expressions are obtained:

$$\overline{ij} \approx \frac{1}{2}\overline{cg} = \frac{1}{2}y, \tag{3}$$
$$\overline{km} \approx \frac{1}{2}\overline{cg} = \frac{1}{2}y$$

In the quadrilateral bjmd, the segments $\overline{bj}$, $\overline{ng}$ and $\overline{dm}$ are parallel with one another, and the segment $\overline{jg}$ is approximately equal to the segment $\overline{gm}$. Thus, the following relation is obtained:

$$2\overline{ng} \approx \overline{bj} + \overline{dm} \tag{4}$$

On the other hand, the following expressions are obtained utilizing the expressions (2) and (3):

$$\left.\begin{aligned}\overline{ng} &= \overline{cg} - \overline{cn} \approx y - x_2, \\ \overline{bj} &= \overline{bi} + \overline{ij} \approx x_1 + \frac{y}{2}, \\ \overline{dm} &= \overline{dk} + \overline{km} \approx x_3 + \frac{y}{2}\end{aligned}\right\} \tag{5}$$

Introducing the expressions (5) into the expression (4), the track displacement y for the multiple cord length 2 l is expressed as a function of the values of track displacements $x_1$, $x_2$ and $x_3$ computed for the individual unit chord lengths l, as follows:

$$y \approx x_1 + 2x_2 + x_3 \tag{6}$$

The above description has referred to the case in which the curve of the displaced track portion 1-3 is simply upwardly convex. The expression (6) applies also to a curve of downwardly convex configuration, but in this case, the sign is negative. Even when a curve includes both an upwardly convex portion and a downwardly convex portion as shown in FIG. 6b, similar consideration applies to prove the effectiveness of the expression (6) although it is necessary to take into account the proper sign. A plurality of upwardly and downwardly convex portions may be included in the displaced track portion 1-3 within the range of the length 2 l. However, the values of track displacement $x_1$, $x_2$, etc. can be obtained by the measuring mechanism used for the measurement of track displacement for the unit chord length l described already. Thus, the curved configuration of the displaced track portion 1-3 will not be discussed further herein.

The above idea of detecting track displacement for a multiple chord length 2 l can be extended to detect track displacement for multiple chord lengths 4 l, 8 l and so on. However, an error will be included in the computation according to the computing formula (6) for the multiple chord length 2 l during to the approximation, and such an error will accumulate with the extension of the principle to the multiple chord lengths of higher order. For practical applications, therefore, it is desirable that the multiple chord length be limited to 2 l and 4 l where l is the basic or unit chord length of 10 meters. It is to be added in this connection that a Versed sine pertinent to a curve is present at a curved portion of the track. (The term Versed sine denotes the segment of a perpendicular at the mid-point of a chord which is cut between the chord and the associated arc.) Such a value may be included as spurious data in the measured data of track displacement in the case of the aforesaid method of measuring track displacement at three spaced points along a chord. However, due to the fact that a curved portion of a track ranges generally over a length of about several hundred meters, such a spurious data can be distinguished from the true data of track displacement under consideration on account of the decisive difference in length.

Figure 7:
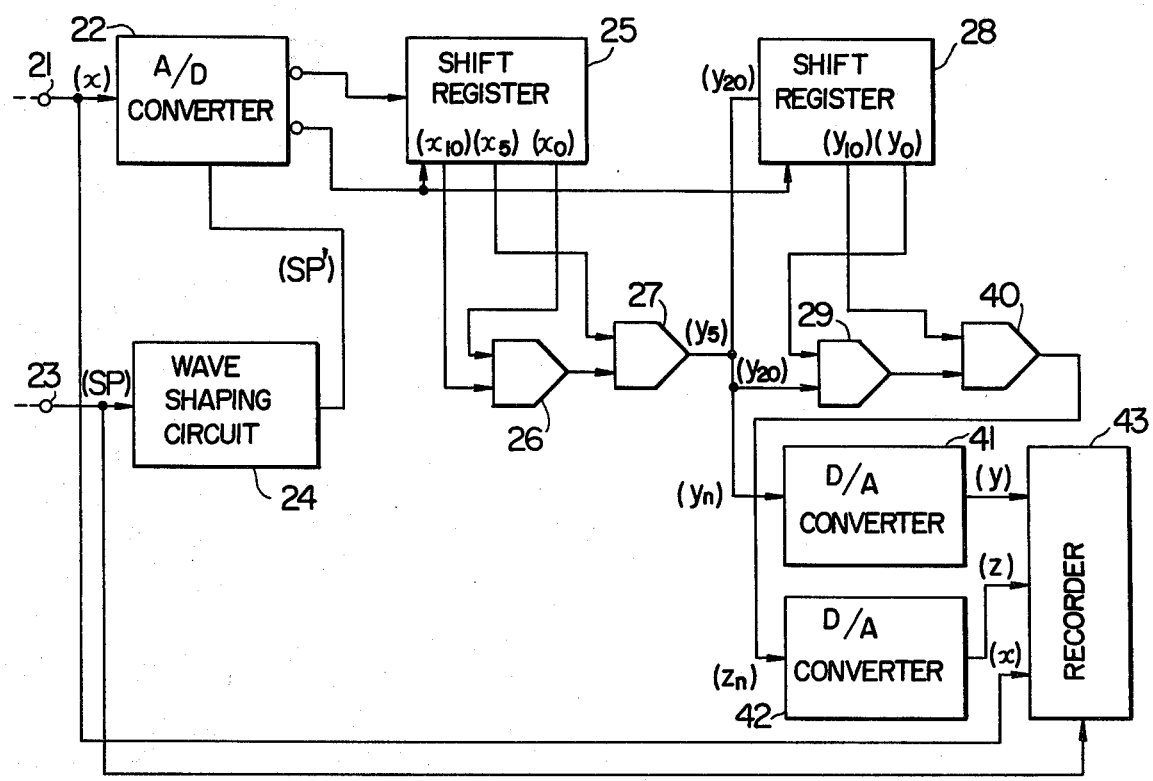
FIG. 7 is a block diagram of an arithmetic circuit preferably employed in the present invention for computing track displacement for multiple chord lengths.

A circuit preferably used for the computation of y in the case of the multiple chord length will be described with reference to FIG. 7 showing a circuit diagram according to the present invention.

In the prior art means for detecting track displacement for the unit chord length l, the three data, i.e., deviations obtained simultaneously from the three sensors are put into the equation (1) to compute the value x of track displacement, and the data at successive points on the track are continuously measured with the advancing movement of the track inspection car. In contrast, in seeking the value y of track displacement for the multiple chord length, three data values $x_1$, $x_2$ and $x_3$, i.e., displacements obtained at spaced points on the track as shown in FIG. 6a are used for the computation. These data values are stored in a memory so that they can be read out from the memory at a necessary point (time) to be used for the computation. Further, the three measuring points providing the data to be read out from the memory must be very precisely spaced by a predetermined distance along the chord of multiple length.

To this end, in the present invention, a distance pulse signal consisting of a train of pulses generated at intervals of a predetermined distance is used for the writing of data measured at the points spaced precisely by the predetermined distance. The memory employed for this purpose may be an analog sampling and holding circuit as disclosed in the Reference No. 5. According to the results of a test conducted by the inventors, however, such a sampling and holding circuit produces errors or continuation of measurement becomes impossible when the track inspection car is running at a low speed or is not moving, due to the limited effective holding time of the sampling and holding circuit. Thus, this sampling and holding circuit is unfit for practical applications. Further, the drift occurring in the sampling and holding circuit provides another source of errors. In view of the above disadvantages of the sampling and holding circuit, the present invention employs a digital shift register as the memory. The digital shift register can effectively store data irrespective of lapse of time, and the desired precision can be satisfied by providing the number of register digits as required.

The data of track displacement for the multiple chord length is obtained at a point (time) which differs from the point (time) at which such data is obtained for the basic or unit chord length l. More precisely, in the case of the multiple chord length 2 l, the data y of track displacement at the point c in FIG. 6a is not obtained until the data $x_3$ representing the track displacement is measured at the point d along the basic or unit chord length l.

In the present invention, the track displacement data x for the unit chord lengths l is recorded to deal with track displacement of relatively short range, while the track displacement data y for the multiple chord lengths 2 l and the track displacement data z for the multiple chord lengths 4 l are recorded to deal with track displacement fo relatively long range. These data values x, y and z of track displacement are recorded by recording pens on a recording sheet in parallel with one another so that the state of track displacement can be displayed in greatest detail. For this purpose, it is necessary to attain matching of the recorded data values since these data are picked up at different points of the unit and multiple chord lengths. The present invention is featured by the fact that the positions of the recording pens in the recording section are suitably displaced relative to one another so as to simply attain the desired purpose.

Referring to FIG. 7, the basic data, that is, the measured data x for the basic or unit chord lengths l is applied through an input terminal 21 to an analog-digital converter 22 (referred to hereinafter as an A/D converter). The distance pulse signal sp is applied through another input terminal 23 to a wave shaping circuit 24. This distance pulse signal sp is cyclically generated in response to the rotation of one of the traveling wheels of the track inspection car, and after passing through the input terminal 23 and being shaped in its waveform and adjusted in its level by the wave shaping circuit 24, the wave-shaped and level-adjusted pulse signal sp' is applied to the A/D converter 22 to trigger the A/D converter 22. The analog data signal x representing the track displacement measured by the set of three sensors or transducers (for horizontal track displacement or vertical track displacement) mounted on the individual trucks of the track inspection car is applied through the input terminal 21 to the A/D converter 22 to be converted into a digital signal by the A/D converter 22 triggered by the distance pulse signal sp'.

A supplementary description will be given on the distance pulse signal sp. The track displacement data measured in the track inspection car is recorded on a continuous recording sheet or chart in a relation proportional to (in a scaled-down relation to) the traveling distance of the track inspection car. In order to record the data in proportional relation to the traveling distance, the recording sheet is fed at a rate proportional to the traveling speed of the track inspection car. For this purpose, a pulse generator is directly coupled to the axle of one of the traveling wheels of the track inspection car to generate the distance pulse signal sp above described, and this pulse signal sp is applied to a pulse motor provided in the sheet feeding mechanism so that the recording sheet can be fed at the rate proportional to the traveling speed of the track inspection car. In the field of track inspection the method of obtaining such a pulse signal sp has already been established as referred to in the above. The function of the circuit shown in FIG. 7 will be described on the premise that such distance pulse signal sp is commonly known in the art. The distance pulses sp are generally generated at intervals of 1 meter.

Figure 8:
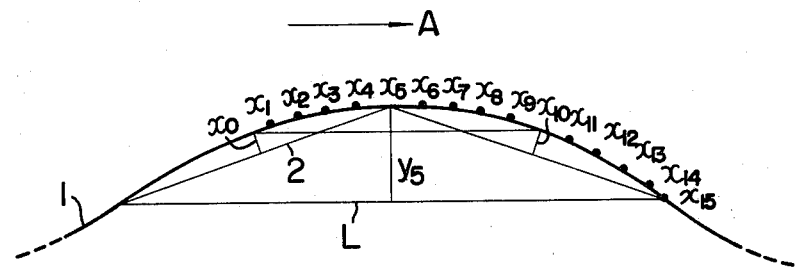
FIG. 8 is a diagrammatic plan view of a portion of the track to illustrate the relation between the measured points and the corresponding basic data.

The circuit shown in FIG. 7 includes a first shift register 25 consisting of a plurality of stages, a first binary adder 26 and a second binary adder 27. As described above, the A/D converter 22 is triggered by a specific distance pulse sp' to convert the analog track displacement data x at a point into a digital data. Upon completion of the A/D conversion, an A/D conversion end signal (referred to hereinafter as an A/D END signal) appears at an output terminal of the A/D converter 22. An A/D converter providing such an A/D END signal is readily available in the market, and utilization of such an A/D converter is common in practice. The A/D END signal is applied to the first shift register 25 so that the track displacement data having been stored already in this shift register 25 is shifted by one stage to the right, and the new data supplied from the A/D converter 22 is written in the first stage of the shift register 25. FIG. 8 shows the state of data stored successively in the shift register 25 with the traveling movement of the track inspection car. In FIG. 8, $x_0$ represents digital track displacement data digitized by the A/D converter 22 from analog data measured at a certain point on the track, and $x_1, x_2, x_3, \ldots$ are track displacement data values digitized successively in response to the application of the distance pulses sp generated at intervals of 1 meter. In FIG. 8, L represents the chord of multiple length 2 l, and the value of track displacement $y_5$ for this chord of multiple length 2 l is determined from the values of $x_0$, $x_5$ and $x_{10}$. That is, $y_5$ is computed from the computation formula (6) as $y_5 \approx x_0 + 2x_5 + x_{10}$. From the aspect of time, $y_5$ is computed immediately after $x_{10}$ is obtained, and the length of time required for the computation is too short to give rise to an error. In this manner, track displacement data values $y_6, y_7, \ldots$ at individual points of measurement are successively obtained with the traveling movement of the track inspection car.

The process of selecting the data $x_0$, $x_5$ and $x_{10}$ and adding them to obtain $y_5$ will be described with reference to FIGS. 7 and 8. Referring to FIG. 7 again, the first shift register 25 consists of eleven stages connected in cascade. Thus, at the time at which the data $x_{10}$ shown in FIG. 8 is measured and supplied to the shift register 25, the data values $x_0, x_1, \ldots, x_{10}$ are now stored in the shift register 25. The register stages storing presently the individual track displacement data $x_0$, $x_5$ and $x_{10}$, among all the register stages, are connected to the first and second adders 26 and 27 by lines as shown in FIG. 7. Therefore, the data values $x_0$ and $x_{10}$ are supplied to the first adder 26, while the data value $x_5$ is supplied to the second adder 27, and the output of the first adder 26 is applied to the second adder 27. In FIG. 7, the register stage storing presently the data value $x_5$ is connected to the input of the second adder 27 so that each bit of the data value $x_5$ stored in the shift register 25 is supplied to the second adder 27 while shifting to the next higher bit position for the purpose of addition of $2x_5$ in the computation formula (6). Such an arrangement is employed for simplifying the structure of the adder circuit. The addition according to the computation formula (6) is carried out in the manner above described, and the signal representing the track displacement data $y_5$ appears at the output of the second adder 27.

After the computation of $y_5$, the track displacement data $y_6$ is computed as $y_6 \approx x_1 + 2x_6 + x_{11}$ at the time at which the next data $x_{11}$ is obtained with the traveling movement of the track inspection car. In this manner, track displacement data values $y_5, y_6, y_7, y_8, \ldots$ for the individual chords of multiple length 2l are successively detected at intervals of 1 meter. Since, in this case, the values of $y_n$ are detected at intervals of 1 meter, track displacement for a very short length or a length shorter than 1 meter is not detected according to the above computation, and the length of 1 meter provides the limit of measurement for the track displacement.

Description will next be directed to computation of the track displacement data z for a chord of multiple length 4l. For this purpose, the circuit shown in FIG. 7 includes a second shift register 28, a third adder 29 and a fourth adder 40. The process of computation in this case is generally similar to that carried out for the multiple chord length 2l. The track displacement data $z_n$, for example, $z_{10}$ for a specific chord of multiple length 4l is computed as $z_{10} \approx y_0 + 2y_{10} + y_{20}$. To this end, the second shift register 28 consists of twenty stages connected in cascade. The second shift register 28 stores $y_0, Y_1, \ldots, y_{19}$, and the output of the second adder 27 is applied directly to the input of the third adder 29 as $y_{20}$. The register stages storing presently $y_0$ and $y_{10}$ are connected to the inputs of the third and fourth adders 29 and 40 respectively.

The above description has referred to the case in which the track displacement data $y_n$ for the chords of multiple length 2l is computed, and then using the computed values of $y_n$, the track displacement data $z_n$ for the chords of multiple length 4l is computed. However, the track displacement data $z_n$ may be directly computed on the basis of the track displacement data $x_n$ for the basic or unit chord lengths l. Various computing circuits including such direct computing means are included within the scope of the present invention as far as those circuits are designed for the computation of the track displacement data for the chords of multiple length.

Description will then be directed to means for recording such track displacement data $x_n$, $y_n$ and $z_n$. For this purpose, the circuit shown in FIG. 7 includes a first digital-analog converter (D/A converter) 41, a second D/A converter 42, and a pen recorder 43 recording the data on a continuous recording sheet. The digital outputs $y_n$ and $z_n$ of the second and fourth adders 27 and 40 are applied to the first and second D/A converters 41 and 42 respectively to be converted into analog data without employing any especial trigger pulses each time the values of the outputs $y_n$ and $z_n$ are renewed. The outputs of the D/A converters 41 and 42 are held at their original values until the next new inputs are applied. These outputs $y_n$ and $z_n$ actuate the pens of the recorder 43 to record the data on the recording sheet. Such manner of data recording is commonly practiced in this field, and any detailed description is unnecessary. However, due to the fact that the track displacement data $x_n$ for the unit chord lengths l is also recorded on the recording sheet in the recorder 43 in parallel relation with the track displacement data $y_n$ and $z_n$, positional non-coincidence or dislocation exists between these data values $x_n$, $y_n$ and $z_n$.

In the present invention, this dislocation problem is solved by shifting the positions of the pens reltive to one another by the amount corresponding to the dislocation so that the data obtained at the same measuring point can be recorded in an accurately timed relation, although such means are not especially illustrated. As described already, the distance pulse signal sp is utilized to drive a pulse motor for feeding the recording sheet in the recorder 43 at a rate proportional to the traveling distance of the track inspection car.

In lieu of the recording of the measured data on the recording sheet, the data may be magnetically recorded on an analog or digital data recorder for a more complex analysis of the track displacement in another data processing system. It will be understood that recording of the analog or digital outputs on a tape recorder can be easily practiced in the track displacement detecting and measuring system according to the present invention.

Figure 9:
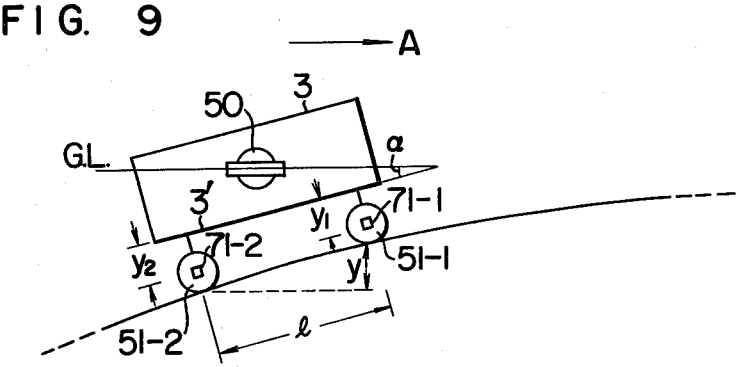
FIG. 9 is a schematic side elevational view of the track inspection car to illustrate the principle of measurement of vertical track displacement according to the present invention.

FIG. 9 illustrates the principle of detecting and measuring vertical track displacement by means of a gyro device which sets the reference line or ground line. Referring to FIG. 9, a gyro device 50 is mounted on the car body 3 to detect the angle α between the ground line or surface G.L. and the extension of the floor 3' of the car body 3. The traveling wheels 51-1 and 51-2 are each provided with a vertical deviation measuring mechanism as shown in FIG. 3, and angle transducers in these mechanisms provide vertical deviations $y_1$ and $y_2$ respectively. These vertical deviations $y_1$ and $y_2$ represent the vertical distance (vertical to the floor 3') between the floor 3' of the car body 3 and the journal boxes 71-1 and 71-2 on the axles respectively. When the center-to-center distance between the journal boxes 71-1 and 71-2 is l, the vertical track displacement y is given by the following equation:

$$y = l \tan(\alpha + \tan^{-1} \frac{y_1 - y_2}{l}) \quad (7)$$

A problem as will be described presently is involved in such a gyro device used for setting the ground line G.L. In principle, a gyro device can accurately measure angular deviations as it is kept in its self-supporting posture while it is stationary or spinning at a uniform rate. However, it is a very essential and most serious problem that, in the presence of an acceleration, precession occurs on the gyro device and its self-supporting stability is affected to cause an angular change. As described previously, the speed of a train is repeatedly increased and decreased, and an acceleration (a centrifugal force) is imparted to the train due to the gyrating movement at a curved portion of the track. In the case of the track inspection car for the New Tokaido Line, however, the risk of being subjected to the acceleration of the kind above described is rather less than that in the train, since the number of stops is relatively small and the track inspection car is driven generally at a uniform speed. In any case, a gyro device which can operate stably against an acceleration has been demanded, and one which satisfies the above demand to a certain extent has already been developed.

Figure 10:
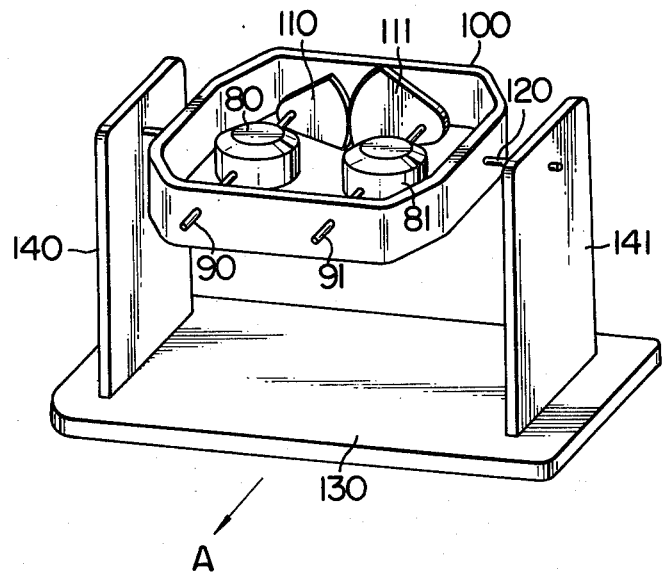
FIG. 10 is a schematic perspective view showing the structure of a prior art gyro device used for detecting the pitching angle.

The outline of such a prior art gyro device will be described with reference to FIG. 10. Referring to FIG. 10, each of a pair of rotor casings 80 and 81 contains a gyroscopic rotor therein, and these rotor casings 80 and 81 have respective shafts 90 and 91 corresponding to the inner gimbal pivots which extend in parallel with each other through an outer gimbal ring 100 to support the rotor casings 80 and 81 for free rotation within the outer gimbal ring 100. A pair of arcuate friction plates 110 and 111 are fixedly mounted on the respective inner gimbal pivots 90 and 91 to make frictional engagement with each other at their arcuate peripheral edges. Thus, the inner gimbal pivots 90 and 91 make such restricted motion that they rotate through the same angle in the directions opposite to each other. The outer gimbal ring 100 has a pair of pivots 120 extending through a pair of spaced side plates 140 and 141 erected on a base plate 130, so that the outer gimbal ring 100 can make free rotation between the side plates 140 and 141 in which the pivots 120 are journaled. Although not shown in FIG. 10, the rotor casings 80, 81 and the outer gimbal ring 100 have their centers of gravity located beneath their pivots 90, 91 and 120 respectively so as to make a pendulum action. On account of this pendulum action, the inner gimbal pivots 90, 91 and the outer gimbal pivot 120 can swing back to their balanced positions. The rotors in the two rotor casings 80 and 81 are rotated in the directions opposite to each other.

Suppose that the prior art gyro device of the described structure is mounted on the track inspection car, and the arrow A in FIG. 10 shows the advancing direction of the track inspection car. The outer gimbal pivots 120 are disposed orthogonal to the advancing direction of the car body 3 so as to detect the pitching angle of the car body 3 by the angular position of the outer gimbal pivots 120. By the action of the two rotors rotating in the directions opposite to each other, the outer gimbal ring 100 can be very stably supported against a shock imparted by irregular movement of the car body and can thus measure the pitching angle with high precision.

Behavior of the gyro device reacting the acceleration will now be discussed. The acceleration produced due to the increase and decrease in the speed of the track inspection car is imparted in the advancing direction of the track inspection car. According to the law regarding the three directions of the spin vector, torque vector and precession vector in a gyro, the force couple of the precession is imparted to the inner gimbal pivots 90 and 91 to rotate these pivots 90 and 91 in the directions opposite to each other. However, the rotor casings 80 and 81 tilted by the rotation of the inner gimbal pivots 90 and 91 tend to be restored to their original positions by the aforesaid pendulum action, and at the same time, the outer gimbal ring 100 starts to tilt. As a consequence, the rotor casings 80, 81 and the outer gimbal ring 100 have such a relationship between the cause and the effect that they oscillate cyclically with a phase difference at about 90°. The important fact to be noted in the above discussion is that the inner gimbal pivots 90 and 91 respond immediately to the imparted acceleration, but the outer gimbal ring 100 does not respond immediately and responds gradually with some delay time.

In the case of the track inspection car for the New Tokaido Line, it runs generally at a uniform speed after several minutes of acceleration and deceleration. Thus, when the oscillation period of the gyro device is selected to be sufficiently long, the adverse effect of the acceleration on the outer gimbal ring 100 can be avoided inter alia during the period of speed increase and decrease, and the pitching angle of the car body can be measured error-free during this period. The results of the research on the gyro device above described prove that the longer the oscillation period, the less is the adverse effect of the acceleration imparted within a predetermined period of time. Thus, when appropriately applied, the gyro device having such a structure may be used in the track inspection car for the New Tokaido Line.

It is to be pointed out, however, that the prior art gyro device discussed above has still a serious defect. That is, although the gyro device can stably measure the pitching angle when the acceleration is imparted in the advancing direction of the track inspection car as a matter of principle, the outer gimbal ring 100 may be adversely affected by the acceleration imparted in a direction orthogonal to the advancing direction of the track inspection car according to the aforesaid law for the gyro. Further, the inner and outer gimbals will interfere with each other in a complex mode due to the factors including the friction at the individual pivots in the gyro device. According to the results of experiments conducted while taking these unstable factors into account, it has been found that the prior art gyro device is unable to stably operate especially when it tilts in a direction orthogonal to the advancing direction of the track inspection car, that is, when the outer gimbal pivots 120 tilt in this direction due to rolling, and such a tilt results immediately in the loss of the self-supporting stability of the gyro device. A considerable degree of rolling, which is sometimes as large as more than several degrees, occurs on the body of a passenger car running on the New Tokaido Line. Further, at a curved portion of the track, the centrifugal force is imparted to the car body due to the cant in addition to the rolling, and it is unable for the prior art gyro device to maintain its self-supporting stability. It is therefore necessary to eliminate the tendency of tilting movement of the outer gimbal pivots 120.

As is commonly acknowledged, the gyroscopic technique has been highly advanced, and an advanced gyro device which is stable against acceleration, gyration, etc. has already been put into practical use in instruments used for navigation of, for example, aircrafts and ships in the air and at sea. It is needless to say that the gyro device which is the principal component of such instruments must operate with high stability. In addition to the fact that such a highly stable gyro device is expensive, various auxiliaries and computers used in the instruments are also quite expensive. In contrast, the present invention contemplates the provision of an economical gyro device of small size and light weight suitable for mounting on the track inspection car for which the expensive gyro device of the kind used for navigation of, for example, aircrafts in the air is not desired. Under such circumstances, a track displacement detecting and measuring system has been demanded which is capable of stably detecting and measuring vertical track displacement while obviating the defect of the prior art gyro device which is easily affected by the rolling.

It is therefore one aspect of the present invention to provide a track displacement detecting and measuring system which includes an improved gyro device which obviates the defect of the prior art gyro device which is easily adversely affected by the rolling (right-left tilting) thereby stabilizing the function of deviation measurement, and in which the combination of the pitching angle data detected by the gyro device and the data obtained by the vertical track deviation measuring mechanisms mounted on the journal boxes are computed to measure the amount of vertical track displacement of long wavelength.

Figure 11:
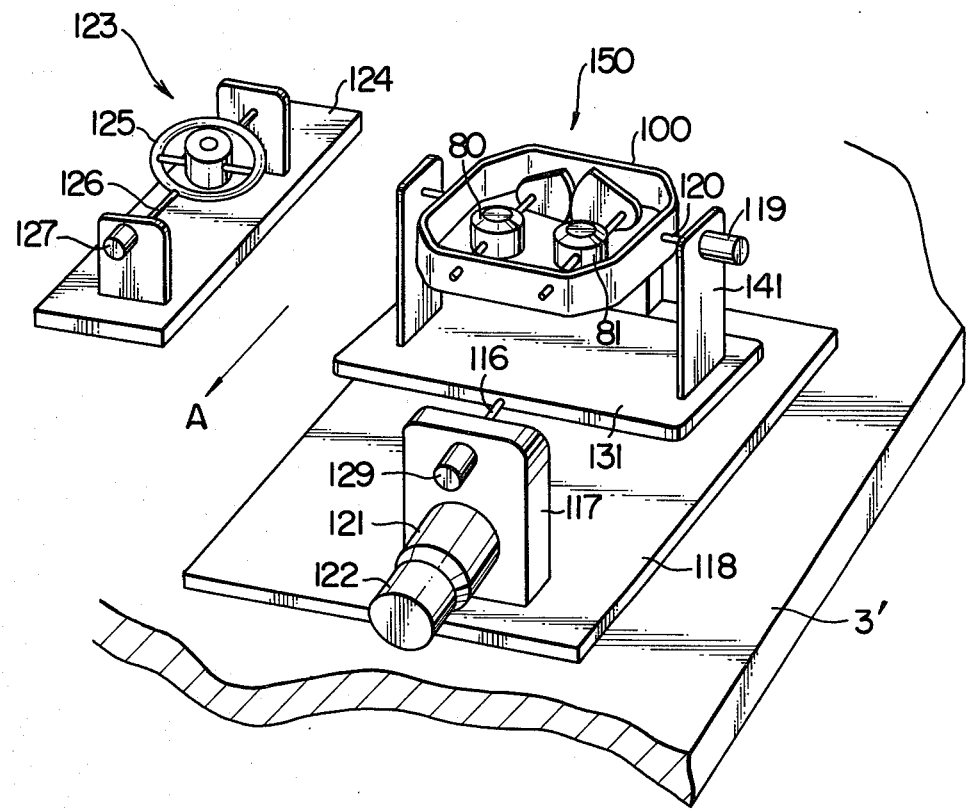
FIG. 11 is a schematic perspective showing the structure of an improved gyro device preferably employed in the present invention.

The improved gyro device preferably employed in the track displacement detecting and measuring system according to the present invention consists of two gyro units as shown in FIG. 11. One of these two gyro units is the prior art one described with reference to FIG. 10. The first gyro unit 150 is mounted on a servo bed 131 as shown in FIG. 11, and a servo mechanism for maintaining the servo bed 131 in the horizontal position independently of the rolling of the car body 3 of the track inspection car is provided so that the gyro unit 150 can stably detect the pitching angle of the car body 3. The other or second gyro unit 123 detects the rolling angle to apply a signal representing the detected rolling angle to the servo mechanism, and a known vertical type of simple structure commonly employed in this field may be conveniently used as this rolling angle detecting gyro unit 123. Such a simple rolling angle detecting gyro unit 123 can be used in the present invention because the precision of maintaining the servo bed 131 in the horizontal position need not necessarily be so high. Thus, the simple one can attain substantially the desired purpose although it is considerably inexpensive.

In the system, known angle transducers commonly emplyed in this field are directly connected to the gimbal pivots to electrically detect the pitching angle and rolling angle, and electrical signals thus obtained are applied to an arithmetic unit or control unit. The arithmetic unit and control unit are of the types which can operate with high precision in spite of a simple structure.

FIG. 11 is a schematic perspective view of the improved gyro device employed in the present invention to illustrate how the two gyro units are disposed relative to each other. The pitching angle detecting gyro unit is designated generally by the reference numeral 150, and a servo bed 131 corresponds to the base plate for the prior art gyro device shown in FIG. 10. Other parts shown in FIG. 10 are also used intact in the pitching angle detecting gyro unit 150. A servo shaft 116 for actuating the servo bed 131 is rotatably journaled in a gear box 117 having a gear train therein. The gear box 117 is mounted on a base plate 118. An angle transducer 119 is directly connected to one of the outer gimbal pivots 120, and another angle transducer 129 is directly connected to the servo shaft 116. A servo-motor 121 coupled to a tachogenerator 122 is connected to the gear box 117.

The base plate 118 is fixedly mounted on the floor 3' of the car body 3 in such a relation that the outer gimbal pivots 120 of the pitching angle detecting gyro unit 150 extend in a direction orthogonal to the advancing direction, shown by the arrow A, of the track inspection car, and the pitching angle can be detected by the angle transducer 119 connected directly to the outer gimbal pivot 120. By virtue of the action of the two rotors rotating in the directions opposite to each other, the gyro unit 150 can operate with high stability during traveling movement of the track inspection car at a uniform speed. To deal with the acceleration imparted in the advancing direction during the speed increasing and decreasing stage, the oscillation period is selected to be sufficiently long so that the outer gimbal pivots 120 can be held stable for a certain period of time to minimize errors that may be included in the values measured during this period of time. This oscillation period is desirably as long as possible, but there is a theoretical limit. A practical oscillation period of about 20 minutes is required, and the gyro unit 150 is constructed to meet this requirement. Selection of the oscillation period at 20 minutes is effective in minimizing errors that may be included in the pitching angle data detected after the speed increasing and decreasing stage lasting for about several minutes.

The function of the servo mechanism will be described which protects the pitching angle detecting gyro unit 150 from being adversely affected by the rolling. In the servo mechanism, necessary current is supplied to the servo-motor 121 to rotate the servo shaft 116 through the gear train in the gear box 117 thereby maintaining always the servo bed 131 in the horizontal position, so that the pitching angle can be stably measured even when the track inspection cars is subjected to rolling. Referring to FIG. 11, the gyro unit 123 required for controlling the rolling angle is mounted on a base plate 124 and includes an outer gimbal ring 125 supported by outer gimbal pivots 126, and an angle transducer 127 connected directly to one of the outer gimbal pivots 126. The base plate 124 is fixedly mounted on the floor 3' of the car body 3.

Figure 12:
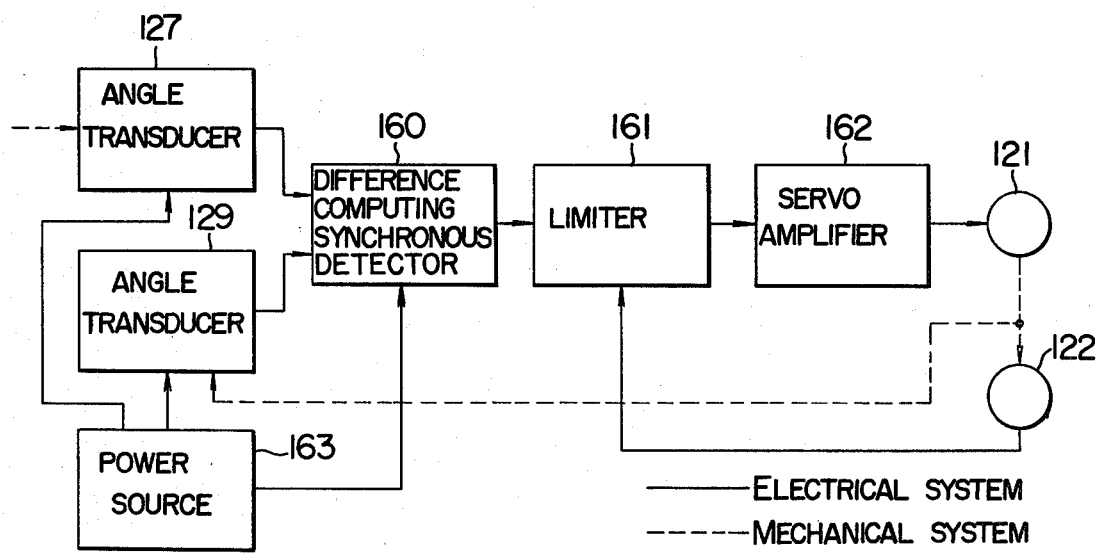
FIG. 12 is a block diagram of a control circuit preferably employed in the present invention for controlling the gyro devices shown in FIG. 11.

FIG. 12 is a block diagram of a control circuit preferably used in conjunction with the servo mechanism for the improved gyro device shown in FIG. 11. Referring to FIG. 12, the control circuit includes a difference computing, synchronous detection and detecting circuit 160, a limiting circuit 161, a servo amplifier 162 and an AC power source 163. In this control circuit, AC current of 400 Hz is supplied from the power source 163 to the angle transducers 127 and 129, so that a signal current of amplitude proportional to the angular position corresponding to the rolling angle of the car body can be derived. The servo bed 131 and the outer gimbal ring 125 in FIG. 11 are previously held in the horizontal position so that the signal current outputs of the angle transducers 127 and 129 are null in such a position of the elements 131 and 125. When now rolling is imparted to the car body 3 to tilt the base plate 124 of the rolling angle detecting gyro unit 123, the rolling angle is detected by the angle transducer 127. On the other hand, the tilt angle of the servo bed 131 in this case is detected by the angle transducer 129. In response to the application of the signal current outputs of these angle transducers 127 and 129, the difference computing, synchronous detection and detecting circuit 160 computes the difference therebetween, and the resultant current is subjected to synchronous detection and detection by the current of aforesaid frequency supplied from the power source 163 to provide a DC current having a positive or negative polarity. The polarity and value of this DC current represent the direction of rotation of the servo shaft 116 relative to that of the outer gimbal pivots 126 and the angular difference therebetween respectively. This DC current is supplied through the limiting circuit 161 to the servo amplifier 162 which supplies a drive current instructing the required direction of rotation and the required angle of rotation to the servo-motor 121 to cause corresponding rotation of the servo shaft 116. Since the signal current appearing from the angle transducer 129 in response to the rotation of the servo shaft 116 is looped in the difference computing, synchronous detection and detecting circuit 160, the servo shaft 116 continues to rotate until the difference current becomes null. The servo shaft 116 ceases to rotate when coincidence is reached between the angular position of the servo shaft 116 and that of the outer gimbal pivots 126. Thus, the servo bed 131 is held in the horizontal position as far as the outer gimbal ring 125 is maintained in the horizontal position. The tacho-generator 122 and the limiting circuit 161 are provided for preventing transient oscillations occurring in the controlled system due to an abrupt angular change. The servo mechanism described above is in itself based on the technique already commonly known in the art and is not peculiar to the present invention.

Figure 13:
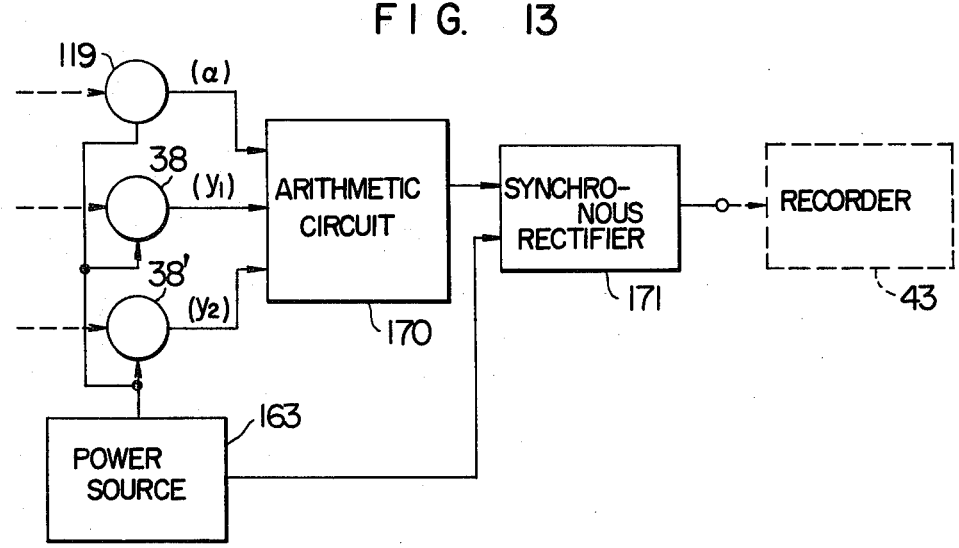
FIG. 13 is a block diagram of an arithmetic circuit preferably employed in the present invention for computing vertical track displacement.

It will be apparent from the above description that the output signal of the angle transducer 119 in the improved gyro unit 150 shown in FIG. 11 and the output signals of the angle transducers 38 and 38' associated with the respective journal boxes 71-1 and 71-2 shown in FIG. 9 represent respectively the angle $\alpha$ and vertical deviations $y_1$ and $y_2$ in the equation (7) described hereinbefore. The manner of processing these signals to seek the vertical track displacement y will be described with reference to a processing circuit shown in FIG. 13. Referring to FIG. 13, the processing circuit includes an arithmetic circuit 170 and a synchronous detection and rectifying circuit 171. The data signal current appearing from the angle transducer 119 in the pitching angle detecting gyro unit 150 shown in FIG 11 and the data signal currents appearing from the angle transducers 38 and 38' provided in the journal box vertical deviation measuring mechanisms shown in FIG. 3 are applied to the arithmetic circuit 170 in which the computation according to the equation (7) is carried out to provide the resultant output. In this case, the signal currents from the angle transducers 119, 38 and 38' are supplied in the form of AC currents of 400 $H_z$ having amplitudes proportional to the detected angles and are computed in that form to provide an AC current output. The AC current output of the arithmetic circuit 170 is subjected to synchronous detection and rectification in the synchronous detection and rectifying circuit 171 by the AC current of the aforesaid frequency supplied from the power source 163, and a DC current output representing the value y of positive or negative polarity appears from the circuit 171. The positive and negative polarities of this output correspond to a slope or gradient and a falling cant respectively.

The processing circuit shown in FIG. 13 can be easily designed and fabricated without resorting to any especial technique, and yet, the required precision of computation can be ensured.

An improved car position detecting device preferably used in the system according to the present invention will be described as follows.

The data measured by the track inspection car must be recorded in exact coincidence with the measuring points or positions. To this end, the recording sheet is fed at a rate proportional to the traveling distance of the track inspection car, and distance marks indicating a predetermined distance of, for example, 500 meters between the measuring points are printed on the recording sheet. The distance pulse signal sp (a signal proportional to the distance) described hereinbefore is utilized for the purpose of feeding the recording sheet at the rate proportional to the traveling distance, and the distance pulses are suitably counted down to provide the distance mark signal. The distance pulse signal sp is utilized not only for the purpose of recording but also as a basic pulse signal or clock pulse signal for the data processing. In order to obtain such a distance pulse signal, an oscillator is generally connected directly to one of the traveling wheels of the track inspection car to generate pulses in proportional relation to the rotation of the wheel. However, the distance pulses thus obtained are not necessarily proportional to the distance due to the slip of the wheel when braked or due to the wear on the wheel. Thus, the traveling distance detected by counting the number of such distance pulses may include an error, and such an error may accumulate to a considerable extent with the increase in the traveling distance. Suppose, for example, that the distance pulses used in the measurement by the track inspection car for the New Tokaido Line include a mean error of 1/1,000 per kilometer. Then, a cumulative error of 1 kilometer occurs in a total length of 1,000 kilometers, and the measured data are entirely unusable for the investigation and processing purposes.

In order to avoid such a cumulative error, it is effective to detect the physical position of the track inspection car at intervals of a predetermined distance and to utilize the signal thus obtained for the correction of the traveling distance detected by counting the distance pulses. The detected position signal used for this purpose must be highly reliable.

As described previously, in a prior art optical position detecting device, a halogen lamp emitting visible light continuously is employed as a light source, and metallic mirrors are disposed at predetermined intervals along the track opposite to the light source. Such a prior art optical position detecting device has been defective in that the S/N ratio is quite low due to reflection of natural radiations of the sun in the daytime, and the strength of light emitted by the light source must be considerably high compared with the natural radiations so as to improve the S/N ratio. This cannot be however attained so easily. The prior art optical position detecting device has had such another defect that the surfaces of concrete and ballast existing along the track reflect also the light emitted from the light source, and such reflected light tends to produce a detected position signal analogous to the reflected from the reflecting mirror.

In the open air, light passing along an optical path of an optical system tends to be interfered by natural radiations, floating dust and atmospheric phenomena such as fog and condensed dew. Because of the above interference, the reliability of a position detecting device of optical type is low, and a position detecting device of electromagnetic type is exclusively employed in the field of, for example, railway signal security systems when absolute reliability is requested. However, according to this electromagnetic type, detected objects of relatively complex structure must be disposed along the track, and the scale is considerably large. Suppose, for example, that such detected objects are distributed at intervals of 1 kilometer over a total track distance of 1,000 kilometers, then a total of 1,000 detected objects are required amounting to great expenses. In contrast, reflecting members of simple structure are merely required in the optical type, and the equipment cost is far less than that of the electromagnetic type. Thus, the optical type and the electromagnetic type have their merits and demerits.

As described already, the function of the detected position signal in the case of the track inspection car differs from that for the railway signal security and is used for the purpose of correction of distance data measured by the measuring unit. Although the reliability of position detection is required, a slight error which may be involved in the detected data is not necessarily absolutely unadmittable. Suppose, for example, that the distance pulses described hereinbefore have a mean error of 1/1,000, then missing of a detected position in the course of distance data correction at intervals of 1 kilometer will result in an error of 1 meter. This error of 1 meter is, however, corrected when the next position is precisely detected. Thus, missing of a detected position leads merely to a negative hazard that correction is not done on the specific distance data.

On the other hand, however, a spurious position signal gives rise to such an adverse effect that the count of the distance pulse counter at the specific position will be corrected regardless of whatever value counted by the counter, and this correction will lead rather to a greater error. It will thus be seen that the error originated from a spurious detected position signal is more hazardous than the error due to missing of a detected position signal although both of them are an origin of an error. It is therefore necessary to make strict check on the emergence of a spurious detected position signal in a position detecting device for use in the track inspection car. If such check could be satisfactorily made in a position detecting device of optical type, this type of position detecting device is quite useful for the purpose. Thus, development of such a device has been demanded from many years ago.

The position detecting device of optical type according to the present invention is improved over the prior art device in that it eliminates noises due to natural radiations and reflecting matters interfering with precise position detection, and operates stably against joggling movement of the car body. In the improved position detecting device of the present invention, the kind of the light source and the position and structure of the light projector, light receiver and reflecting members are suitably selected, and a suitable signal detecting circuit is employed so as to stably and economically attain the desired position detection.

To eliminate the interference by the natural radiations which is one of the defects of prior art device, a light source emitting light pulses having a duration of about 1 $\mu$sec is employed, and the recurrence period of the pulses is selected to be long to provide a very large peak value. In this case, it is necessary to direct a minimum required number of light pulses toward each of the reflecting members as described later when the traveling speed of the track inspection car is highest, and a suitable recurrence period is selected.

The S/N ratio relative to the natural radiations can be improved by virtue of the employment of the light source of the kind above described. The pulse used to detect the car position disappears very quickly after its appearance, whereas the interference noise produced by the natural radiations varies generally gradually with respect to time. Thus, provision of a high-pass filter in the electrical circuit is effective in removing the substantial portion of the noise due to the natural radiations. Synchronous detection is also utilized in the present invention to completely remove the noise due to the natural radiations. That is, a timing waveform having the same timing as that of the light pulses emitted from the light source is used in the light receiver to be compared with the received pulses for the purpose of synchronous detection, thereby completely removing the noise component whose timing is not coincident with that of the light projected from the light source of light pulses. However, a hazard of detecting a noise component as a spurious signal still remains when such a noise component is synchronous with the projected light pulses. In order to eliminate the above hazard, the signal detecting circuit is so constructed that the presence of a reflecting member is detected only when a plurality of consecutive light pulses are received. By such a manner of detection, more strict check on the emergence of the spurious signal described already can be ensured.

However, the above manner of dealing with the interference by the natural radiations is not still perfect for spurious reflection due to another source of interference, that is, reflecting matters existing along the track. This kind of reflection interference can be basically dealt with by improving the reflectivity of the relfecting members over that of the interfering matters. It has been ascertained that arrangement of the reflecting surface of the reflecting members at a suitable angle in an advantageous direction relative to the interfering matters existing adjacent thereto is considerably effective in dealing with the spurious reflection. Horizontal disposition of the reflecting surface results in a worst S/N ratio since the railway ties and concrete bed have also the horizontal surface. The inclination of the reflection surface has been investigated, and the most suitable direction and angle giving a best S/N ratio have been found. For a relatively small reflecting matter existing along the track such as ballast interfering with the distance detection, the aforementioned method of detecting the presence of a reflecting member on the basis of reception of a plurality of consecutive light pulses is most effective. This is because the relation between the traveling speed of the track inspection car and the reflecting matter such as ballast is such that the required number of consecutive reflected light pulses are hardly received by the light receiver when the ballast is the source of reflection interference.

The car body of the track inspection car joggles considerably to the left and right. It is therefore very important to suitably select the mounting positions of the light projector and light receiver and the directions of light projecting and receiving optical axes to deal with the joggling movement of the car body. In the present embodiment, noting the fact that the trucks and axles are integrally connected, the mounting positions of the light projector and receiver and the directions of the optical axes are so selected as to minimize the adverse effect due to the joggling movement of the car body thereby ensuring the stable operation for measurement.

The car position detecting device of optical type according to the embodiment of the present invention will be described in detail with reference to FIG. 14a to FIG. 19.

Figure 14A:
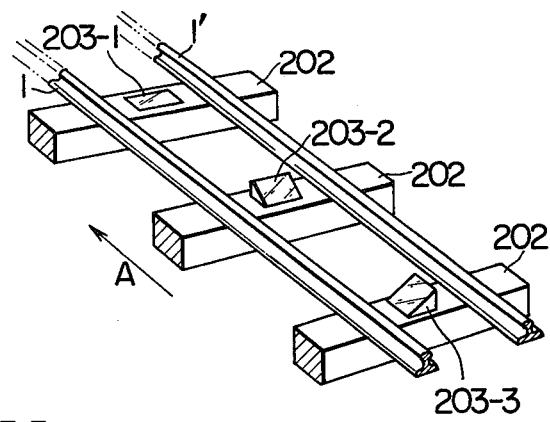
FIGS. 14a and 14b are a schematic perspective view and a schematic side elevational view respectively of reflecting members disposed along the track to illustrate various modes of disposition of such members relative to the track.
Figure 14B:
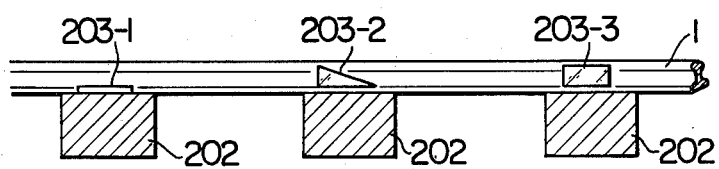
Figure 15A:
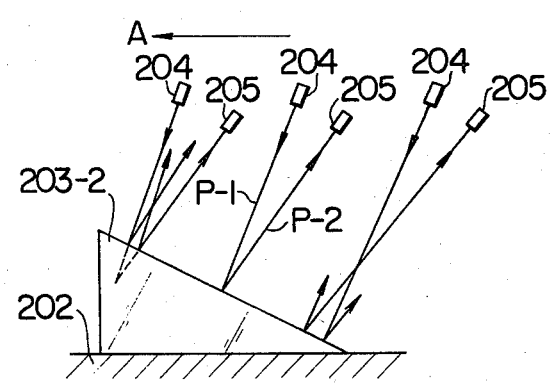
FIGS. 15a and 15b are diagrammatic views showing the relation between the inclination of the reflecting members and the optical axes of incident and reflected light in the two modes of disposition of such members.
Figure 15B:
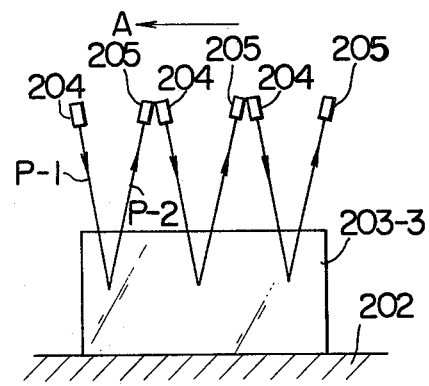

FIGS. 14a and 14b illustrate various manners of disposing reflecting members along the track. Referring to FIG. 14a, three metallic reflecting members 203 are shown mounted on individual railway ties 202 supporting the left-hand and right-hand rails 1 and 1'. These reflecting members 203 are preferably of stainless steel, but any other suitable metal material having a reflectivity equivalent to that of stainless steel may be employed.

In FIGS. 14a and 14b, the reflecting members 203-1, 203-2 and 203-3 have different modes of orientation of their reflecting surfaces. More precisely, the reflecting member 203-1 has its reflecting surface lying in the horizontal plane, and the reflecting member 203-2 has its reflecting surface lying in a plane which inclines at an angle in the direction of the track shown by the arrow A, while the reflecting member 203-3 has its reflecting surface lying in a plane which inclines at an angle in a direction orthogonal to the direction A of the track.

The reflecting performances of these reflecting members 203-1 to 203-3 will now be compared. In the case of the reflecting member 203-1, its reflecting surface lies in the same horizontal plane as that including the upper surface of the corresponding railway tie 202. Thus, this reflecting member 203-1 is basically undesirable in that the light reflected from the railway tie 202 provides a noise component for the light reflected from the reflecting member 203-1. In the case of the reflecting member 203-2, its reflecting surface makes an angle with the horizontal plane. Thus, when this angle is suitably selected, appearance of the noise component due to the light reflected from the railway tie 202 can be avoided. However, this reflecting member 203-2 having its reflecting surface inclining in the advancing direction of the track inspection car is not satisfactory when the relation between the light projecting and receiving optical axes is considered. The reason therefore will be explained with reference to FIGS. 15a and 15b in which the reference numerals and characters 204, P-1, 205 and P-2 designate a light projector, a light projecting optical axis, a light receiver, and a light receiving optical axis respectively. When now the track inspection car travels in the direction shown by the arrow A, it is apparent that the intersection between the light projecting optical axis P-1 and the light receiving optical axis P-2 does not always exist on the reflecting surface of the reflecting member 203-2. Thus, this manner of inclining the reflecting surface in the direction of the track is defective in that the distance between the light projector 204 and the reflecting member 203-2 and that between the light receiver 205 and the reflecting member 203-2 vary depending on the position of the car body resulting in out-of-focus.

In contrast to the reflecting members 203-1 and 203-2, the reflecting member 203-3 is best in that the distances above described can be maintained constant without regard to the traveling movement of of the track inspection car in the case of the reflecting member 203-3. However, in the case of this reflecting member 203-3 too, the distances above described will also differ from each other depending on the disposition of the optical axes P-1 and P-2 as will be explained with reference to FIGS. 16a and 16b. In FIGS. 16a and 16b, the reference numerals 206, 206-1, 206-2; 207, 207-1, 207-2; 208 and 209 designate wheels, journal boxes, an axle and a truck respectively. The truck 209 of the track inspection car has such a construction that the wheels 206 and 206-2 are firmly connected to the axle 208 both ends of which are journaled in the journal boxes 207 and 207-2. Such journal boxes 207 are mounted at the front and rear parts of the truck 209, and a total of four wheels 206 are thus provided. In FIG. 16a, the light projector 204 and light receiver 205 are shown mounted on the truck 209 to have their optical axes P-1 and P-2 disposed in a plane extending in the direction of the track. It is apparent that this arrangement gives rise to out-of-focus when vertical change exists on the rails 1 in the direction of the track. When, however, the light projector 204 and light receiver 205 are mounted on the truck 209 to have their optical axes P-1 and P-2 disposed in a plane extending in a direction orthogonal to the direction of the track as shown in FIG. 16b, the optical path of reflected light can be maintained stable without regard to the inclination and vertical change of the rails 1. This is because the reflecting member 203-3 is fixed to the railway tie 202 supporting the rails 1, and variation in the position of the truck 209 relative to that of the rails 1 is negligible.

The practical structure of the reflecting member 203-3 will be described with reference to FIGS. 17a and 17b which are a schematic side elevational view taken in a direction orthogonal to the direction of the track and a schematic plan view respectively. Referring to FIGS. 17a and 17b, the reflecting member 203-3 comprises a mirror 210 having a reflecting surface 211 and bent side portions 212. The mirror 210 is mounted on a base 213 at its longitudinal end edge portions 214. The reflecting surface 211 has a reflectivity equivalent to or more than that of polished stainless steel. The bent side portions 212 act to retain the flatness of the reflecting surface 211, and the mirror 210 is welded to the base 213 at its logntidinal end edge portions 214. The angle $\theta$ of inclination of the reflecting surface 211 relative to the base 213 is selected to be about 30° so as to eliminate reflection interference by undesired reflecting matters and to meet the limited mounting conditions of the light projector 204 and light receiver 205 on the truck 209. The angle $\theta$ of inclination of the reflecting surface 211 is substantially free from any variation due to the aforesaid structure of the mirror 210. The base 213 mounting such a mirror 210 is securely fixed to the upper surface of the railway tie 202 by bolts extending through bolt holes 215 bored in the base 213. Since the railway ties 202 have their upper surfaces arranged in parallel with and spaced by a predetermined height from the surface of the track, all the mirrors 210 have the same height above the track surface and have their reflecting surfaces 211 oriented at the same angle of inclination relative to the track surface.

On account of the above arrangement, the light receiver 205 can stably receive light reflected from the mirrors 210. However, the truck 209 tends to joggle to the left and right during traveling movement of the track inspection car at high speeds, and also the mounting angles of all the mirrors 210 may not be exactly the same. In the present invention, an optical system is provided to cover such a non-uniformity in the angle $\theta$ of inclination of the mirrors 210 relative to the track surface. Such an optical system will be described with reference to FIG. 18. Referring to FIG. 18, the light receiver 205 includes a light receiving lens 220 of large diameter and a photo sensor 221 of large sensing area. Thus, even when the mounting angle of the reflecting surface 211 of one of the mirrors 210 deviates from the designed inclination angle $\theta$ by $\delta$ and the reflected light passes along an optical path P-3 shown by the dotted lines deviating from the normal optical path P-2 due to the deviation angle $\delta$, the light receiver 205 can satisfactorily receive the light reflected from the reflecting surface 211 of the mirror 210. The effective diameter D of the light receiving lens 220 is naturally easily determined on the basis of the distance $\alpha$ between the lens 220 and the mirror 210 and the deviation angle $\delta$ of the reflecting surface 211 of the mirror 210.

The size of the mirror 210 will now be discussed. As described already, it is necessary to project a required number of light pulses to the mirror 210 at the highest speed of the track inspection car. For example, in the case of the track inspection car for the New Tokaido Line, its highest speed is 210 kilometers per hour or 58 millimeters per msec. Suppose now that the recurrence frequency of light pulses is 1.5 kHz, then the pulse recurrence interval at the highest speed is 39 millimeters. Support further that the length of the reflecting surface 211 in the direction of the track is 150 millimeters, then a total of four light pulses can be consecutively directed toward the reflecting surface 211 of the mirror 210 at the highest speed of the track inspection car. For this reason, the length, 150 millimeters, of the reflecting surface 211 of the mirror 210 is selected as one of suitable values.

FIG. 19 is a block diagram of a circuit preferably used in conjunction with the car position detecting device embodying the present invention. Referring to FIG. 19, the circuit includes a timing waveform oscillator 230, a pair of pulse amplifiers 231 and 232, a high-pass filter 233, a synchronous detector 234, an n-pulse counter 235, and a detected position signal output terminal 236. In this embodiment, the light source of the light projector 204 is a laser beam emitting diode. By virtue of the properties of the laser beam, parallel beams of light having a small angle of beam divergence can be obtained. A laser beam emitting element having a peak optical output of several to ten-odd watts can be easily obtained when the pulse recurrence frequency is selected to be about 1.5 kHz as above described. The light reflected from the reflecting surface 211 of the mirror 210 is condensed by the light receiving lens 220 and is then subjected to photoelectric conversion by the photo sensor 221. The output of the photo sensor 221 is applied to the high-pass filter 233 which acts to remove low frequency components of noise due to natural radiations. The output of the high-pass filter 233 is applied through the pulse amplifier 232 to the synchronous detector 234 in which the pulse signal is compared with a projecting timing waveform supplied from the timing waveform oscillator 230, so that the pulse signal portions appearing with the timing except the projecting timing are removed as noise. In this manner, the noise component due to natural radiations can be almost completely removed. As described previously, however, the above manner of processing is not still effective in avoiding spurious pulses produced due to the reflection of light from matters other than the mirrors 210. The n-pulse counter 235 is provided to prevent errors due to a spurious detected position signal produced by such reflecting matters. The function of this n-pulse counter 235 is such that it applies an ON signal, that is, a detected position signal to the output terminal 236 only when the output of the synchronous detector 234 contains n consecutive pulses. According to the aforesaid example, the number of light pulses reflected from the mirror 210 is four when the pulse recurrence frequency is 1.5 kHz, the length of the mirror 210 in the direction of the track is 150 millimeters, and the traveling speed of the track inspection car is 210 kilometers per hour. In this case, the value of n for the n-pulse counter 235 may be n=2, n=3 or n=4. The greater the value of n, the greater is the possibility of missing a detected position due to unsuccessful reception of a reflected pulse resulting from fouling of the reflecting surface 211 of the mirror 210. In such a case, however, the possibility of emergence of errors is less. For practical purposes, the n-counter 235 adapted for counting two or three consecutive pulses is suitable for the position detection purpose, and the use of such a counter can almost completely prevent emergence of errors.

It will be understood from the above description that the optical type of car position detecting device embodying the present invention employs ready available, standard and economical parts and materials. It is thus advantageous in that its circuit can operate with high reliability in spite of quite simple structure.

We claim:

1. In a track displacement detecting and measuring system including three sensors mounted at the front, middle and rear parts of a track inspection car, respectively, said sensors mounted at the front and rear parts of the track inspection car being spaced apart from each other by a unit chord length, and means for computing the amount of track displacements in the horizontal and vertical directions on the basis of the amounts of rail deviation detected by said three sensors, the improvement comprising:

signal generating means for generating a distance pulse signal consisting of a train of pulses appearing at intervals of a predetermined distance in interlocking relation with the rotation of a wheel of the track inspection car;

analog-digital converter means connected to said computing means and said signal generating means for converting into digital data the amount of track displacement derived from said computing means, which digital data is provided at the output of said converter means in synchronism with the pulses of said distance pulse signal;

a shift register connected to said converter means and consisting of a plurality of stages capable of sequentially storing said digital data provided by said converter means;

an arithmetic circuit connected to said shift register for reading out, from among the data stored in said shift register, data of track displacements obtained for an individual unit chord length at three predetermined spaced points on the track, and for computing a projected amount of a track displacement for a multiple chord length which is an even multiple of said unit chord length from the read-out data of the three track displacements, the positional interrelation among said predetermined three spaced points for said multiple chord length corresponding to the positional interrelation among said three sensors for said unit chord length;

digital-analog converter means for converting the output of said arithmetic circuit into analog data; and recording means for recording said analog track displacement data applied from said digital-analog converter means together with said analog track displacement data derived from said computing means.

2. A track displacement detecting and measuring system as claimed in claim 1, wherein said arithmetic circuit computes the amounts of track displacement y and z for multiple chord lengths 2l and 4l, which are two times and four times the unit chord length l respectively, according to the formulas $$y \approx x_1 + 2x_2 + x_3$$

$$z \approx y_1 + 2y_2 + y_3$$

where $x_1$, $x_2$ and $x_3$ are the amounts of track displacement for individual unit chord lengths l at three spaced points on the track, and $y_1$, $y_2$ and $y_3$ are the amounts of track displacement for individual chord lengths 2l at three spaced points on the track.

3. A track displacement detecting and measuring system as claimed in claim 1, comprising a position detecting device comprising:

a plurality of reflecting members disposed at predetermined intervals along the track and having a reflecting surface inclining at a predetermined angle with respect to the track surface and oriented in a direction orthogonal to the direction of the track;

a light projector mounted on a truck of the track inspection car and including a light source emitting light pulses at predetermined time intervals;

a light receiver mounted on said truck of the track inspection car for receiving the light reflected from said reflecting members;

a synchronous detection circuit carrying out synchronous detection of the electrical signal output of said light receiver with the timing of the light pulses emitted from said light source; and a pulse counter counting the number of pulses in the output of said synchronous detection circuit thereby generating an output signal when it counts two or more consecutive pulses, whereby an error which may be included in the distance pulse signal generated by said distance pulse signal generating means can be corrected on a recording sheet in said recording means by the output signal of said pulse counter.

4. A track displacement detecting and measuring system comprising:

a plurality of reflecting members disposed at predetermined intervals along the track and having a reflecting suface inclining at a predetermined angle with respect to the track surface and oriented in a direction orthogonal to the direction of the track;

a light projector mounted on a truck of a track inspection car and including a light source emitting light pulses at predetermined time intervals;

a light receiver mounted on said truck of the track inspection car for receiving the light reflected from said reflecting members;

a synchronous detection circuit carrying out synchronous detection of the electrical signal output of said light receiver with the timing of the light pulses emitted from said light source;

a pulse counter counting the number of pulses in the output of said synchronous detection circuit thereby generating an output signal when it counts two or more consecutive pulses; and means for obtaining a signal correcting an error which may be included in a distance pulse signal consisting of a train of distance pulses generated at intervals of a predetermined distance in interlocking relation with the rotation of the wheel of the track inspection car.

5. A track displacement detecting and measuring system as claimed in claim 4 wherein said light projector and said light receiver are disposed opposite to said reflecting members so that both the light projecting optical axis and the light receiving optical axis lie in a plane extending orthogonal to the direction of the track.

* * * * *